DUAL CHANNEL FREQUENCY DIVERSITY TRANSMITTER FOR HIGH POWER COHERENT RADAR

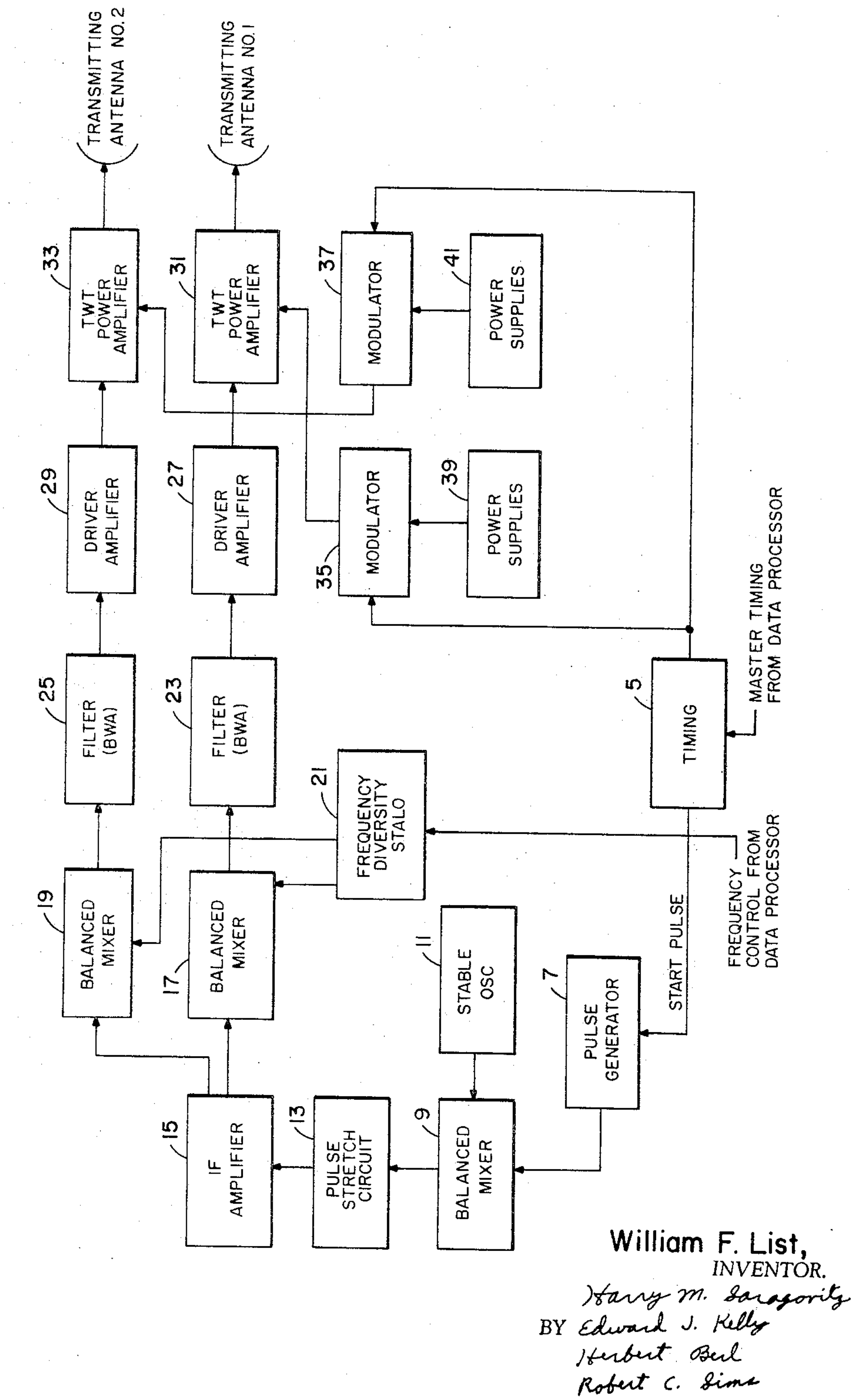
William F. List,
INVENTOR.
BY Harry M. Saragovitz
Edward J. Kelly
Herbert Berl
Robert C. Sims 3,337,865

William F. List, Linthicum Heights, Md., assignor, by mesne assignments, to the United States of America as represented by the Secretary of the Army Filed May 20, 1965, Ser. No. 457,547
8 Claims. (Cl. 343—5)

The invention described herein relates to a frequency diversity transmitter for coherent radar and more particularly to a dual channel frequency diversity transmitter for high power coherent radar.

In the operation of highly discriminate radar units, extremely coherent stalo (stabilizer local oscillator) operation is required for high stability in frequency selection for frequency diversity transmitters. In the prior art devices, frequency selection has been accomplished by generating all frequencies at the transmitting frequency with selection of the desired frequency accomplished by use of waveguide switches or the equivalent. A preferable method would be to generate the required frequencies at lower frequencies and translate these frequencies to the required transmitting frequency by a combination of multipliers and heterodyning techniques as low frequency sources are more amenable to selection and control by switching gates that are generated by a data processor unit. This type of stalo would also permit the use of solid state technique which promise increased reliability and more stable performance in the operational environment. Further, there is need for a stalo which is used to drive dual output channels which give high average output power and enhances reliability since loss of one power amplifier channel will reduce output power only 3 db.

In view of these facts, it is an object of this invention to provide a highly reliable coherent radar transmitter.

Another object of this invention is to provide selection of a desired transmitter frequency without the use of waveguide switches.

Further, an object of this invention is to provide higher average power output due to dual channel transmitters.

The various features of novelty which characterize this invention are pointed out with particularity in the claims annexed to and forming a part of this specification. For a better understanding of this invention, however, its advantages and specific objects obtained with its use, reference should be had to the accompanying drawings and descriptive matter in which is illustrated and described a preferred embodiment of the invention, and in which the single figure illustrates a system, in block diagram, according to the invention.

In order to better understand the operation of the system described in the figure, a description of its components referred to is first presented.

The transmitter subsystem as shown in the figure includes a transmitter timing unit 5, a pulse generator 7, a balanced mixer 9 and associated local oscillator 11, pulse stretch circuitry 13, IF amplifier 15, two balanced mixers 17 and 19 to heterodyne the stretched pulse to the transmitting frequency. The mixers 17 and 19 are driven by a transmitting stable microwave oscillator unit (stalo) 21, which includes both the frequency generator equipment and the necessary switching circuitry to provide the required frequency diversity. The outputs of mixers 17 and 19 are connected respectively to wave guide filters 23 and 25 which selects the desired sideband by use of backward wave amplifier tube (BWA). The selected sidebands are then fed into the driver amplifiers 27 and 29 respectively. Traveling wave tube (TWT) power amplifiers 31 and 33 are connected respectively to the outputs of driver amplifiers 27 and 29. Power amplifiers 31 and 33 feed transmitting antennas 1 and 2 respectively and are switched in a predetermined manner by modulators 35 and 37 respectively having power supplies 39 and 41 connected respectively thereto.

The operation of the invention occurs in the following manner. A local oscillator signal generated by stalo 21 is modulated by a pulse generated by pulse stretching circuit 13. A narrow pulse of a width corresponding to the desired range resolution time is generated in accordance with time signals from timing unit 5 and a data processor controlling the master timing connected to timing unit 5. This pulse so generated is used to modulate a stable local oscillator signal from local oscillator 11 at a predetermined IF frequency. This frequency is selected on the basis of desired compression ratio, bandwidth requirements and over-all stretch-compress filter size considerations. The gated pulse at IF frequency is transmitted through a filter network whose frequency phase characteristics is designed to stretch the input pulse in a desired manner. This filter consists of a large number of identical networks which are coupled to provide a linear phase shift versus frequency characteristic. The effect of this characteristic on the transmitted pulse is to delay the low frequency components of the transmitted pulse more than the high frequency components. The pulse leaving the stretch filter is thus longer than the incoming pulse by the compression ratio. Because of attenuation through the stretch filter, suitable amplification of the stretched pulse is provided by amplifier 15. Amplifier 15 must be properly designed to transmit the stretched pulse without frequency distortion so that the stretched pulse can be properly reconsructed when it is received.

The stretched pulse, suitably amplified, is employed to modulate the signal from stalo 21 in the balanced wave guide mixers 17 and 19. A sideband of each mixer 17 and 19 is selected by electrically tuned backward wave amplifiers forming filters 23 and 25 which both select the desired sideband and attenuates microwave harmonic signals which would interfere with other surrounding equipment. The selected side bands are fed into driver amplifiers 27 and 29 to drive the traveling wave tube power amplifiers 31 and 33. The power amplifiers 31 and 33 are switched "off" or "on" by modulators 35 and 37 respectively which are controlled by the timing unit 5. Modulators 35 and 37 effectively connect power supplies 39 and 41 to the traveling wave tube power amplifiers 31 and 33 respectively during the time a signal is to be transmitted.

The output of the TWT type amplifiers 31 and 33 provides the required gain, stability and power handling capability to drive the transmitting antennas 1 and 2 respectively.

One unique feature of this transmitting system is that each transmitting amplifier chain is time shared on an integration period basis controlled by stalo 21. For this specific radar application, this period is 62.5 milliseconds. The separate units each transmit bursts of pulses for alternate 62.5 millisecond periods. During the transmitting period, TWT tubes actually operate twice its rated average power, however, its use on alternate periods is less than the tubes averaging period. The use of a single tube for each integration period eliminates coherency problems which would arise if both tubes operated in parallel or alternated on a pulse-to-pulse basis. The use of dual channels also provides inherent redundancy to improve reliability.

What is claimed is:

1. A frequency diversity radar transmitter comprising: a frequency diversity oscillator for generating a plurality of signals at different frequencies; said frequency diversity oscillator having an output and a control input for separately selecting one of said plurality of signals; signal generating means for generating an additional signal contained in a pulse envelope; timing means connected to said signal generating means for controlling the occurrence of said additional signal; mixing means connected to an output of said signal generating means and to an output of said frequency diversity oscillator for mixing said selected one of said plurality of signals and said additional signal thereby giving an output at a desired transmitting frequency; transmitting antenna means; and means connecting the output of said mixer means to supply said antenna means.

2. A device as set forth in claim 1 wherein said means connecting said output of said mixer means to said antenna means comprises: a filter means; driver amplifier means; power amplifier means; said filter means connected to the output of said mixer means and being tuned to pass a particular frequency output from said mixer means; said driver amplifier means connected between said filter means and said power amplifier means for driving said power amplifier means; and said power amplifier means connected between said driver amplifier means and said antenna means.

3. A device as set forth in claim 1 wherein said signal generating means comprises: a pulse generator means; a balanced mixer means; oscillator means; pulse stretching means; amplifier means; said pulse generator means being connected to said timing means to be responsive thereto; said balanced mixer means being connected to said pulse generator means in combination with said oscillator means; said pulse stretching means being connected tosaid balanced mixer means; and said amplifier means being connected to said pulse stretching means.

4. A device as set forth in claim 2 wherein said power amplifier means has a switched power supply means connected thereto; and said switched power supply means being connected to said timing means whereby said power amplifier means is switched "on" when a signal is to be transmitted and "off" when the signal ceases to be transmitted.

5. A device as set forth in claim 1 wherein said balanced mixer means includes a first and a second balanced mixer; said antenna means includes a first and second transmitting antenna; said connecting means includes a first and a second connecting means; said first and second balanced mixer means having their inputs connected to said additional signal means; said first connecting means connected between said first transmitting antenna and said first balanced mixer means; and said second connecting means connected between said second transmitting antenna and said second balanced mixer means.

6. A dual channel frequency diversity transmitter for high power coherent radar comprising: a first and a second transmitting antenna; a first and a second power amplifier connected respectively to said first and said second antenna; a first and a second power supply; a first switching means connected between said first power supply and said first power amplifier; a second switching means connected between said second power supply and said second power amplifier; a first and second driver amplifier having an input and an output; said output of said first driver amplifier connected to an input of said first power amplifier; said output of said second driver amplifier connected to an input of said second power amplifier; a first and second filter connected respectively to said inputs of said first and second driver amplifier; a first and second balanced mixer; said first and second mixer each having a first and second input and an output; said outputs of said first and second balanced mixer connected respectively to said first and second filters; an IF amplifier; said IF amplifier having a first and second output and an input; said first and second output of said IF amplifier connected respectively to said first input of said first and second mixer; a pulse stretching circuit connected to said input of said IF amplifier; a third balanced mixer; said third balanced mixer having a first and second input and an output; said output of said balanced mixer connected to said pulse stretching circuit; a stable oscillator connected to said first input of said third balanced mixer; a pulse generator connected to said second input of said third balanced mixer; a timing means; said timing means having a first and second output; said first output of said timing means connected to said pulse generator for applying a start pulse thereto; said second output of said timing means connected to said first and second switching means for actuating said switching means whereby said switching means will switch said power amplifiers "on" or "off" in a predetermined manner; a frequency diversity stable oscillator; said frequency diversity stable oscillator having a first and second output and an input; said first and second outputs of said frequency diversity oscillator connected respectively to said second input terminals of said first and second balanced mixers; said frequency diversity oscillator having means therein for generating a plurality of signals at different frequencies; and control means connected to said input of said frequency diversity oscillator for separately selecting one of said plurality of signals.

7. A device as set forth in claim 6 wherein said first and second filter each comprises a backward wave amplifier tube electrically tuned to a predetermined frequency at said output of said first and second balanced mixer.

8. A device as set forth in claim 7 wherein said first and second power amplifier each comprises a traveling wave tube amplifier; and said traveling wave tubes being alternately switch "on" and "off" at predetermined time intervals during transmitting periods whereby said first and second antennas will transmit coherent radiations.

No references cited.

RODNEY D. BENNETT, *Primary Examiner.*

C. L. WHITHAM, *Assistant Examiner.*